United States Patent

Laane

[15] 3,701,017

[45] Oct. 24, 1972

[54] DELTA-MODULATION TERMINAL CIRCUIT

[72] Inventor: Rein Raymond Laane, Wheaton, Ill.

[73] Assignee: Bell Telephone Laboratories, Incorporated, Murray Hill, N.J.

[22] Filed: Dec. 14, 1970

[21] Appl. No.: 97,902

[52] U.S. Cl. ................325/38 B, 179/70 NC, 325/21, 343/80

[51] Int. Cl. ..............................................H04b 1/52

[58] Field of Search ............325/21, 22, 23, 24, 38 B; 343/180; 179/170 NC, 15 AE, 15 AD

[56] References Cited

UNITED STATES PATENTS

| | | | |
|---|---|---|---|
| 3,582,785 | 6/1971 | Gaunt | 325/38 R |
| 3,530,260 | 9/1970 | Gaunt | 179/170 |
| 3,540,049 | 11/1970 | Gaunt | 343/180 |

*Primary Examiner*—Richard Murray
*Assistant Examiner*—Kenneth W. Weinstein
*Attorney*—R. J. Guenther and R. B. Ardis

[57] ABSTRACT

A delta-modulation coder-decoder terminal circuit in which incoming digital signals are applied to both the coder and decoder integrators. Reconstructed identical signal outputs of both relating to the digital input are applied to the inputs of the comparator via a summing network which also receives originating analogue signals for transmission. Cancellation of the incoming digital reconstructions is achieved thereby preventing regeneration of the latter for retransmission back to its source. The reconstructed incoming signal output from the decoder integrator is transmitted to the receiver via the summing network.

11 Claims, 2 Drawing Figures

INVENTOR
R. R. LAANE
BY William H. Kamstra
ATTORNEY

DELTA-MODULATION TERMINAL CIRCUIT

BACKGROUND OF THE INVENTION

This invention relates to hybrid circuits for use in communication systems and more particularly to such circuits for converting between two- and four-wire transmission in systems employing delta-modulation as an analogue to digital coding technique.

Delta-modulation as a technique for the digital encoding of analogue signals is well known in the art and has been considered from various aspects in the literature. A comparison with other pulse code modulation systems is drawn, for example, by F. K. Bowers in the *A.I.E.E. Transactions-Communications and Electronics*, No. 30, May 1957, at pages 142–147. Briefly, in a delta-modulation system, rather than encoding absolute amplitude values of the analogue signal, only changes in amplitude are encoded. At an originating coder terminal of the system a series of periodic binary coded pulses is transmitted, each binary value being indicative of the direction of the input modulating signal during a particular sampling interval. The binary signals, in addition to their transmission to the receiving terminal, are also fed back to an integrating circuit at the originating terminal. There the signals are reconstructed into an approximation of the original input. The approximated signal is compared with the now incoming signal and the difference is employed to control the generation of the binary pulse to be transmitted to the receiving terminal during a succeeding interval.

More specifically, if at any time the input signal is larger than the reconstructed signal then the difference is positive and a pulse representative of a binary "1" is transmitted to the receiving terminal and to the integrating circuit. The output of the latter is then increased. On the other hand, if the input signal is smaller than the reconstructed signal, the difference will be negative and a pulse representative of a binary "0" (or a no pulse condition) is transmitted to the receiving terminal and to the integrating circuit. As a result, the output of the latter circuit will be decreased. This output, either increased or decreased, when compared with the incoming modulating signal, repeats the cycle to control the polarity of the difference, which again determines the binary decision transmitted to the receiving terminal. At the latter point a decoder comprising a second integrating circuit reconstructs the original modulating signal for detection.

It will be appreciated from the foregoing that each terminal, in order both to transmit and receive, must be provided with both a coder and a decoder, in most cases, the coder and decoder of each terminal being interconnectable respectively with the decoder and coder of another terminal by separate two-wire transmit and receive transmission channels. In many communication systems, for example, in a telephone system, the four-wire connections between any two or more communicating terminals must be isolated from each other in their terminations in two-wire station apparatus. If some means for isolating incoming and outgoing signals is not provided, regenerative coupling may seriously interfere with communication between station terminals. Further, circuit arrangements must be provided to achieve an impedance match between the two-wire station line and the four-wire transmission channels to avoid signal reflection. To achieve these ends hybrid circuits are normally employed in the prior art. Although resistive hybrid arrangements are known, for the most part hybrid circuits comprise transformer windings and balancing networks which add substantially to the complexity and cost of four-wire communication line terminations as well as introduce a source of loss to the transmitted signals.

Delta-modulation systems are known in the prior art in which the hybrid circuit function is accomplished entirely without the use of transformer windings of resistive networks thus considerably simplifying four-wire to two-wire conversion in these systems. One such arrangement is disclosed, for example, in U.S. Pat. No. 3,540,049 of W. B. Gaunt, Jr., issued November 10, 1970, filed Oct. 26, 1967. In this system the hybrid function is accomplished at each terminal by a summing circuit to which feedback from the delta-modulation comparator is separately applied via two distinct circuits. The conventional reconstructed input signal derived from the delta-modulation comparator output of coded pulses being transmitted to a receiving terminal is applied via a first integrator at the transmitting terminal. This reconstructed signal is compared with the incoming analogue signal to modify the binary coding if the latter signal has changed in amplitude.

A second reconstructed signal, substantially the same as the conventional one above except that it is inverted, is applied via a second integrator at the transmitting terminal and a feedback path which includes the receiving terminal. At the latter terminal the coded binary pulses are reconstructed by the integrator there, inverted, applied to a corresponding summing circuit, introduced to the terminal comparator, and returned to the transmitting terminal, again as coded binary pulses. In the absence of a transmission from the receiving terminal, the returning signal in its inverted form corresponding to the original signal from the transmitting terminal cancels the latter signal with the result that no portion of the signal being transmitted is returned to its source. A four-wire to two-wire conversion is thus accomplished without the use of a conventional hybrid circuit.

It is an object of this invention to reduce even further the number of circuit elements required to achieve four-wire to two-wire conversion in a delta-modulation communication system terminal.

Another object of this invention is to provide a new and novel transmission line termination in a delta-modulation communication system.

It is also an object of this invention to accomplish the hybrid circuit function in a delta-modulation communication system in a new and novel manner.

SUMMARY OF THE INVENTION

The foregoing and other objects of this invention are realized in one illustrative delta-modulation terminal circuit in which the coding function is combined with the hybrid function. A digital signal incoming to the terminal from the transmission network is gated not only to the decoder integrator, as is conventional, but also to the coder integrator during one clock cycle. The identical reconstructed signal outputs of both integrators are applied to the comparator, which circuit, sensing no amplitude difference with respect to these outputs, generates no digital output relating to the reconstructed incoming signal. Retransmission of the latter signal is thus effectively inhibited. The reconstructed incoming signal is transmitted to the ultimate receiver by applying the output of the decoder integrator to the comparator via a summing circuit. At this circuit, the reconstructed incoming signal is also transmitted to the terminal station destination.

Conventional coding of an analogue signal to be transmitted from the terminal circuit is accomplished during a subsequent clock cycle. The analogue signal is applied via the summing circuit to the comparator together with the reconstruction of the comparator digital output.

It is thus one feature of this invention that a digital signal incoming to a delta-modulation coder-decoder circuit is applied to both the coder and decoder integrators, the reconstructed outputs of both integrators being applied to the comparator effectively to cancel at that point the incoming signal and thereby to prevent its retransmission back to its source.

Another feature of a delta-modulation coder-decoder circuit according to this invention is a summing network for algebraically adding a reconstructed digital incoming signal and an analogue outgoing signal, the sum then being applied both to the comparator and to an output circuit for detection.

BRIEF DESCRIPTION OF THE DRAWING

The objects and features of this invention will be better understood from a consideration of the detailed description of the organization of one illustrative embodiment thereof which follows when taken in conjunction with the accompanying drawings in which.

DETAILED DESCRIPTION

Figure 1:
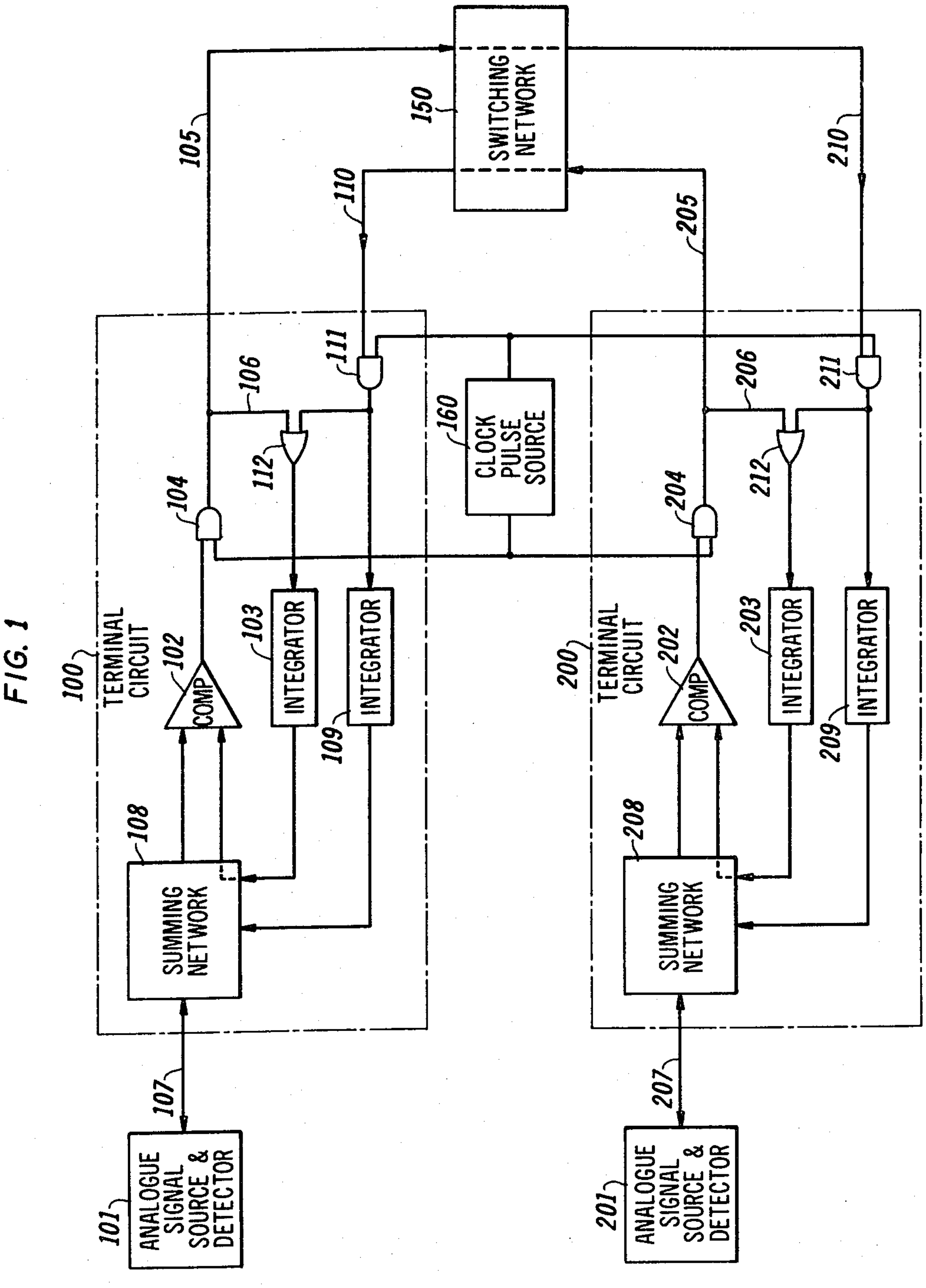
FIG. 1 is a block diagram of an illustrative delta-modulation communication system according to this invention showing a representative pair of station terminals.

An illustrative delta-modulation system according to this invention, depicted in FIG. 1, is for purposes of description simplified to a pair of communicating terminal circuits 100 and 200 serving analogue signal sources and detectors 101 and 201, respectively. The latter elements may comprise any equipment capable of transmitting and receiving analogue signals such as, for example, a telephone station subset. The terminal circuits 100 and 200 are interconnected by means of a typical transmission switching network 150 of a character well known in the art capable of selectively establishing transmission paths therethrough between subscriber stations. The terminal circuits 100 and 200 are identical and each includes a coder and a decoder. The coder of circuit 100, for example, comprises a comparator 102 having a pair of inputs and further comprises an integrator 103 and an AND gate 104 for gating the digital output from comparator 102 to the unilateral outgoing transmission line 105. A feedback path 106 including integrator 103 from line 150 to one of the inputs of comparator 102 conventionally provides a reconstruction of the digital output on line 105 during a transmission interval in accord with the delta-modulation pulse coding. Analogue signals generated at the source 101 are carried via a bilateral transmission line 107 and summing network 108 to the other input of comparator 102.

The decoder of circuit 100 comprises a second integrator 109 identical in characteristics to coder integrator 103 and has applied thereto digital signals appearing on unilateral incoming transmission line 110. Each of the elements so far described as well as their counterparts in terminal circuit 200 are well known in the art and are operable to accomplish the same functions as accomplished by corresponding elements of prior art delta-modulation coders and decoders. Accordingly, the circuit details of these elements are readily envisioned by one skilled in the art and need not be catalogued here. Incoming digital signals appearing on transmission lines 110 and 210 are applied during a receive interval, respectively, to the integrators 109 and 209 via AND gates 111 and 211, are reconstructed, and applied via summing networks 108 and 208 to bilateral lines 107 and 207 for transmission to detectors 101 and 201. The details of an exemplary summing network capable of operating in the manner to be described is depicted in FIG. 2 and will be considered hereinafter.

As mentioned in the forgoing, incoming digital signals appearing on transmission lines 110 and 210 are applied to the decoder integrators of the respective terminal circuits. In accordance with the principles of this invention, these incoming signals are also applied to the coder integrators 103 and 203, the feedback paths being shared by the outgoing and incoming digital signals by means of OR gates 112 an 212, respectively. Further, the presumably identical reconstructed outputs of both coder and decoder integrators are applied to the two inputs of a terminal comparator during a receive interval, one of the outputs first being added to whatever analogue signal is present at the summing network. The gates 104–111 and 204–211 are periodically enabled under the control of clock pulses supplied by a clock pulse source 160.

The hybrid circuit function is now seen to be accomplished by the effective cancellation of the incoming signal by the application of its reconstructed form to both inputs of the comparator via the two identical integrators such as integrators 103 and 109. Since the comparator 102 function is conventionally performed by a differential amplifier, no output will be produced as the result of the identical inputs. Should there be an analogue input appearing in the summing network 108 from transmission line 107 during the receive interval, this input is added to the reconstructed signal from integrator 109 and will appear as a difference to comparator 102. Coding of the analogue input is accordingly not effected and the retransmission of the incoming signal back to its source is prevented. A suitable separation of coding and decoding operations is maintained by alternating enable pulses applied to the outgoing gates 104–204 and incoming gates 111–211 to permit sharing of integrators 103 and 203.

Figure 2:
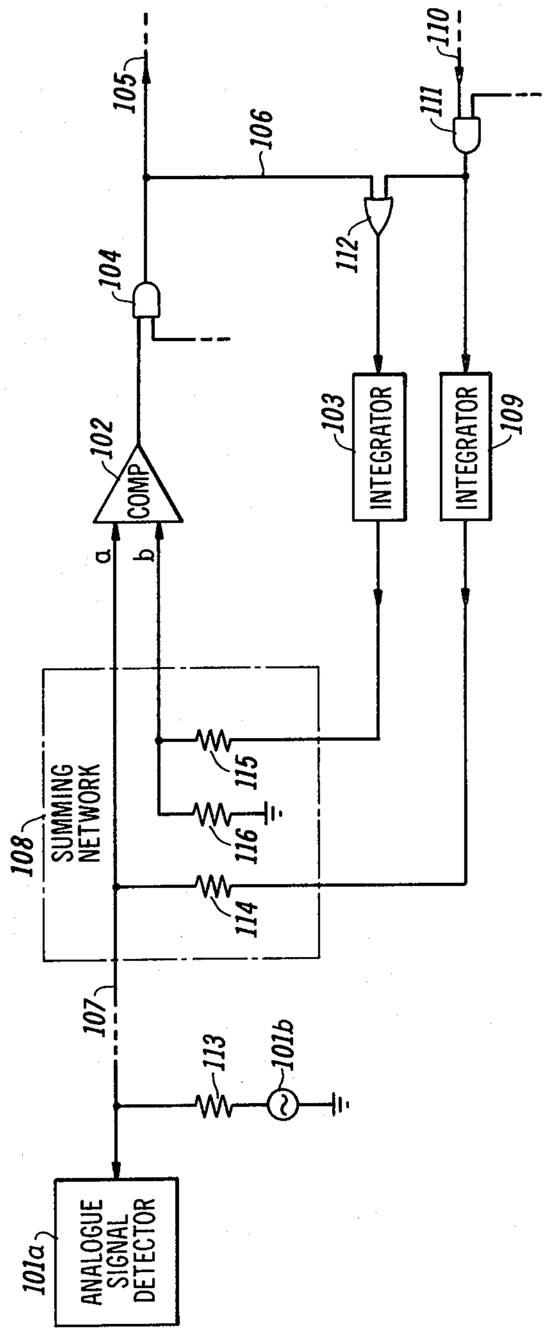
FIG. 2 depicts one specific summing network employed in accomplishing the hybrid circuit function in accordance with this invention.

An exemplary circuit for accomplishing the summing network hybrid function is shown in FIG. 2 where the same reference characters are employed to identify the same elements appearing in terminal circuit 100 of FIG. 1. The circuit of FIG. 2 is to be understood as also applicable to accomplishing the hybrid function of the summing network 208 of terminal circuit 200. Analogue signal source and detector 101 of FIG. 1 are further detailed in FIG. 2 as analogue signal detector 101*a* and analogue signal generator 101*b* connected to bilateral transmission line 107 via generator 101*b*, impedance 113 having the value $Z_1$. The latter impedance also serves as the load for incoming signals from incoming line 110 reconstructed by decoder integrator 109. The reconstructed output of the latter circuit is applied to bilateral line 107 and one of the inputs *a* of comparator 102 via an impedance 114 having the value $Z_2$. The output of coder integrator 103 is applied via impedance 115 to the other input *b* of comparator 102 across a grounded impedance 116. The summing net work is formed by impedances 114, 115, and 116, the values $Z_3$ and $Z_4$ of impedances 115 and 116, respectively, being chosen such that $Z_1 = Z_4$ and $Z_2 = Z_3$. The impedances of the input paths *a* and *b* of comparator 102 are ideally infinite while the impedances of the inputs of integrators 103 and 109 are ideally zero.

The magnitude of the signals recovered by integrators 109 and 103 from the digital signals incoming on transmission line 110 is given by $$V_a = V_d (Z_1/Z_1 + Z_2) \quad (1)$$

and $$V_b = V_c (Z_4/Z_3 + Z_4) \quad (2),$$

where $V_d$ is the output of decoder integrator 109, $V_c$ is the output of coder integrator 103, $V_a$ is the network output appearing on transmission line 107 and the comparator input path *a*, and $V_b$ is the network output appearing on the comparator input path *b*. As previously mentioned, the characteristics of integrators 103 and 109 are identical; accordingly, $V_d = V_c$ and, since $Z_2 = Z_3$ and $Z_1 = Z_4$ then $V_b = V_a$. As a result, comparator 102 will not produce an output as a function of the signals on its inputs *a* and *b* and no digital signals will be generated on outgoing transmission line 105 as a function of the analogue signal reconstructed from the incoming digital signals on line 110. On the other hand, the latter analogue signal is transmitted via transmission line 107 to the impedance load 113 for detection by detector 101 *a*.

Analogue signals generated by source 101*b* are received at bilateral line 107 and transmitted to input a of comparator 102 where $$V_a = V_g (Z_2/Z_1 + Z_2). \quad (3)$$

As a result, a digital code is generated in the conventional manner on outgoing line 105 so that the voltage on input *b* of comparator 102 will track voltage input $V_1$ on input *a* of the comparator, where $$V_b = V_c (Z_4/Z_3 + Z_4). \quad (4)$$

What have been described are considered to be only illustrative embodiments of the invention and it is to be understood that various and numerous other arrangements may be devised by one skilled in the art without departing from the spirit and scope of the accompanying claims.

What is claimed is:

1. In an electrical communication system, a delta-modulation terminal comprising an outgoing and an incoming transmission line, a coder means comprising a comparator circuit having a pair of inputs and an output connected to said outgoing transmission line and a first integrator means, a feedback path connecting said comparator output and one of said comparator inputs and including said first integrator means, a decoder means comprising a second integrator means, a first input circuit means connected to said incoming transmission line also including said first integrator means, and a second input circuit means connecting said incoming transmission line and the other of said comparator inputs and including said second integrator means.

2. In an electrical communication system, the combination as claimed in claim 1 also comprising analogue signal generating and detection circuit means connected to said other of said comparator inputs.

3. In an electrical communication system, the combination as claimed in claim 2 also comprising a summing network connected in said first and second input circuit means for adding analogue signals generated by said signal generating and detection circuit means and signals appearing in said second input circuit means.

4. A delta-modulation coder-decoder circuit comprising an outgoing and an incoming transmission line, an analogue input circuit, first integrator means for generating a first reconstructed signal as determined by signals appearing on said outgoing transmission line during a first clock cycle and for generating a second reconstructed signal as determined by signals appearing on said incoming transmission line during a second clock cycle, a second integrator means for generating a third reconstructed signal as also determined by signals appearing on said incoming transmission line during said second clock cycle, comparator means for comparing said first reconstructed signal and analogue signals appearing in said input circuit during said first clock cycle and for comparing said second and third reconstructed signals during said second clock cycle, and summing means for adding said analogue signals and said third reconstructed signal.

5. A delta-modulation coder-decoder circuit as claimed in claim 4 also comprising analogue signal detection means for detecting the output of said summing means during said second clock cycle.

6. A delta-modulation coder-decoder circuit comprising an outgoing and an incoming transmission line, an analogue signal input circuit, a comparator means having an output connected to said outgoing transmission line, a coder integrator means, a decoder integrator means, circuit means for applying signals appearing on said outgoing transmission line to said coder integrator means during a first time interval, circuit means for applying signals appearing on said incoming transmission line to both said coder integrator means and said decoder integrator means during a second time interval, means for applying output signals of said coder integrator means and signals appearing in said analogue signal input circuit to inputs respectively of said comparator means during said first time interval, and means for applying the output signals of said coder integrator means and said decoder integrator means to said inputs respectively of said comparator means during said second time interval.

7. A delta-modulation coder-decoder circuit comprising an outgoing and an incoming transmission line, a bidirectional analogue transmission line, first circuit means for coupling said analogue transmission line to said outgoing transmission line comprising a signal comparison means having a pair of inputs and an output, a first input being connected to said analogue transmission line and said output being connected to said outgoing transmission line and a feedback path connected to said output of said comparison means, said feedback path including a first integrator means and the other input of said comparison means, and second circuit means for coupling said analogue transmission line to said outgoing transmission line comprising a pair of branches, one of said branches also including said first integrator means and said other input of said comparison means, and the other of said branches including a second integrator means and said first input of said comparison means.

8. A delta-modulation coder-decoder circuit as claimed in claim 7 also comprising analogue signal generating and detection means coupled to said bidirectional analogue transmission line.

9. A delta-modulation coder-decoder circuit as claimed in claim 8 in which said analogue signal generating and detection means comprises telephone station apparatus 10. In a delta-modulation terminal circuit having a coder comparison means, a coder integrating means, and a decoder integrating means, means for inhibiting the regeneration of coded incoming signals comprising circuit means for applying said incoming signals to both said coder integrating means and said decoder integrating means and circuit means for applying reconstructed forms of said coded incoming signals generated by both said coder integrating means and said decoder integrating means to respective inputs of said comparison means.

11. In a delta-modulation terminal circuit as claimed in claim 10, said means for inhibiting the regeneration of coded incoming signals also comprising summing means for combining the reconstructed forms of said coded incoming signals generated by said coder and decoder integrating means and analogue signals applied to said delta-modulation terminal for transmission.

* * * * *